(12) United States Patent
Liu et al.

(10) Patent No.: US 8,729,511 B2
(45) Date of Patent: May 20, 2014

(54) ELECTROMAGNETIC WAVE BEAM SPLITTER

(75) Inventors: Ruopeng Liu, Guangdong (CN); Chunlin Ji, Guangdong (CN); Yutao Yue, Guangdong (CN); Yunnan Hong, Guangdong (CN)

(73) Assignee: Kuang-Chi Innovative Technology Ltd., Guangdong (CN)

( * ) Notice: Subject to any disclaimer, the term of this patent is extended or adjusted under 35 U.S.C. 154(b) by 0 days.

(21) Appl. No.: 14/118,015

(22) PCT Filed: Nov. 21, 2011

(86) PCT No.: PCT/CN2011/082506
§ 371 (c)(1),
(2), (4) Date: Nov. 15, 2013

(87) PCT Pub. No.: WO2012/155475
PCT Pub. Date: Nov. 22, 2012

(65) Prior Publication Data
US 2014/0070117 A1 Mar. 13, 2014

(30) Foreign Application Priority Data

May 16, 2011 (CN) .......................... 2011 1 0125944

(51) Int. Cl.
*H01Q 15/02* (2006.01)
(52) U.S. Cl.
USPC ................ 250/503.1; 250/370.09; 250/493.1; 250/504 R
(58) Field of Classification Search
CPC ..... G02F 2202/30; G01B 27/10; B82Y 20/00
USPC ................ 250/370.09, 493.1, 494.1; 343/909
See application file for complete search history.

(56) References Cited

U.S. PATENT DOCUMENTS

| | | | |
|---|---|---|---|
| 2008/0165079 | A1 | 7/2008 | Smith et al. |
| 2009/0201572 | A1* | 8/2009 | Yonak ........................... 359/316 |
| 2010/0046083 | A1 | 2/2010 | Peng |
| 2010/0225562 | A1 | 9/2010 | Smith |
| 2011/0187601 | A1 | 8/2011 | Ryou et al. |

FOREIGN PATENT DOCUMENTS

| | | |
|---|---|---|
| CN | 101389998 A | 3/2009 |
| CN | 101946365 A | 1/2011 |

* cited by examiner

*Primary Examiner* — Michael Maskell
(74) *Attorney, Agent, or Firm* — Birch, Stewart, Kolasch & Birch, LLP

(57) ABSTRACT

Embodiments of the present invention relate to an electromagnetic wave beam splitter, comprising a functional layer made of at least one metamaterial sheet, wherein different metamaterial sheets have the same refractive index distribution; the metamaterial sheet may be divided into a circular region and an annular region concentric to the circular region; a refractive index increases continuously as a radius increases and refractive indices at the same radius are the same within the circular region; and a refractive index decreases continuously as a radius increases and refractive indices are the same at the same radius within the annular region. The circular region of the functional layer of the beam splitter according to the present invention has the function of diverging an electromagnetic wave; the annular region has the function of converging an electromagnetic wave; the electromagnetic wave incident on the circular region of the functional layer deflects toward edges on two sides of the functional layer respectively; the electromagnetic wave incident on the annular region deflects in a direction toward a circle center; and after an electromagnetic wave emitted by a signal source is incident on the beam splitter, an emergent electromagnetic wave forms an annular radiation region. This can satisfy the requirements of, for example, avoiding an obstacle and interference.

13 Claims, 7 Drawing Sheets

US 8,729,511 B2

ELECTROMAGNETIC WAVE BEAM SPLITTER

FIELD OF THE INVENTION

The present invention relates to the field of metamaterials, and in particular, to a metamaterial-based electromagnetic wave beam splitter.

BACKGROUND OF THE INVENTION

During microwave transmission, it is often required to split an emergent wave beam by a specific angle to satisfy different requirements, such as avoiding obstacles and interference and performing multi-directional emission.

In the prior art, wave beam splitting is implemented mostly by reflection, refraction, or using a semi-reflective surface. During the implementation of the present invention, the inventors find that the prior art has at least the following technical problems: a large amount of energy is consumed by performing wave beam splitting using the existing wave splitting means; an existing wave splitting device is large-sized, resulting in inconvenience in use.

SUMMARY OF THE INVENTION

The main technical problem to be solved by the present invention is to provide an electromagnetic wave beam splitter, which is small-sized and lightweight, and is flexible and convenient for use.

The present invention provides an electromagnetic wave beam splitter, comprising a functional layer made of at least one metamaterial sheet, and impedance matching layers arranged respectively on an electromagnetic wave incident surface and an electromagnetic wave emergent surface of the functional layer, wherein the metamaterial sheet comprises a sheet-like substrate and a plurality of artificial microstructures attached on the substrate, the artificial microstructure being in an axially symmetric structure; each of the metamaterial sheets has the same refractive index distribution; the metamaterial sheet comprises a circular region and an annular region concentric to the circular region; a refractive index increases continuously as a radius increases and refractive indices at the same radius are the same within the circular region; a refractive index decreases continuously as a radius increases and refractive indices at the same radius are the same within the annular region; the artificial microstructures have the same geometric shape; sizes of the artificial microstructures increase continuously as the radius increases and sizes of the artificial microstructures at the same radius are the same within the circular region; and sizes of the artificial microstructures decrease continuously as the radius increases and the sizes of the artificial microstructures are the same at the same radius within the annular region.

According to a preferred embodiment of the present invention, the functional layer is formed by a plurality of metamaterial sheets stacked together.

According to a preferred embodiment of the present invention, each of the artificial microstructures comprises a two-dimensional structure or three-dimensional structure consisting of at least one metal wire.

The present invention provides an electromagnetic wave beam splitter, comprising a functional layer made of at least one metamaterial sheet, wherein the metamaterial sheet comprises a sheet-like substrate and a plurality of artificial microstructures attached on the substrate; each of the metamaterial sheets has the same refractive index distribution; the metamaterial sheet comprises a circular region and an annular region concentric to the circular region; a refractive index increases continuously as a radius increases and refractive indices at the same radius are the same within the circular region; and a refractive index decreases continuously as a radius increases and refractive indices are the same at the same radius within the annular region.

According to a preferred embodiment of the present invention, the functional layer is formed by a plurality of metamaterial sheets stacked together.

According to a preferred embodiment of the present invention, the artificial microstructures have the same geometric shape; sizes of the artificial microstructures increase continuously as the radius increases and sizes of the artificial microstructures at the same radius are the same within the circular region; and sizes of the artificial microstructures decrease continuously as the radius increases and sizes of the artificial microstructures at the same radius are the same within the annular region.

According to a preferred embodiment of the present invention, the artificial microstructure is an axially symmetric structure.

According to a preferred embodiment of the present invention, the artificial microstructure is in an "I" shape, cross shape, or back-to-back double "E" shape.

According to a preferred embodiment of the present invention, each of the artificial microstructures comprises a two-dimensional structure or three-dimensional structure consisting of at least one metal wire.

According to a preferred embodiment of the present invention, the metal wire is a copper wire or a silver wire.

According to a preferred embodiment of the present invention, the metal wire is attached on the substrate by etching, electroplating, drilling, photolithography, electron etching, or ion etching.

According to a preferred embodiment of the present invention, the substrate may be made of ceramic, a macromolecular material, a ferroelectric material, a ferrite material, or a ferromagnetic material.

According to a preferred embodiment of the present invention, the beam splitter further comprises impedance matching layers arranged respectively on an electromagnetic wave incident surface and an electromagnetic wave emergent surface of the functional layer.

The technical solutions described above achieve at least the following beneficial effects:

The circular region of the functional layer of the beam splitter according to the present invention has the function of diverging an electromagnetic wave; the annular region has the function of converging an electromagnetic wave; the electromagnetic wave incident on the circular region of the functional layer deflects toward edges on two sides of the functional layer respectively; the electromagnetic wave incident on the annular region deflects in a direction toward a circle center; and after an electromagnetic wave emitted by a signal source is incident on the beam splitter, an emergent electromagnetic wave forms an annular radiation region. This can satisfy the requirements of, for example, avoiding an obstacle and interference. The beam splitter has a small volume and a light weight, and is flexible and convenient for use.

BRIEF DESCRIPTION OF THE DRAWINGS

To illustrate the technical solutions in embodiments of the present invention more clearly, the attached drawings necessary for description of the embodiments will be introduced briefly herein below. Obviously, these attached drawings only illustrate some exemplary embodiments of the present invention, and persons of ordinary skill in the art may further derive other drawings according to these attached drawings without making inventive efforts.

Among the attached drawings.

DETAILED DESCRIPTION OF THE INVENTION

A metamaterial is a novel material that has artificial microstructures 2 as its basic units that are spatially arranged in a specific mode and has special electromagnetic responses. The metamaterial comprises artificial microstructures 2 and a substrate 1 on which the artificial microstructures are attached. The artificial microstructure 2 comprises a two-dimensional structure or a three-dimensional structure which is made of at least one metal wire. A plurality of artificial microstructures 2 are arranged as an array on the substrate 1, and each of the artificial microstructures 2 and a portion of the substrate 1 on which the artificial microstructure is attached make a metamaterial unit. The substrate 1 may be made of any material that is different from the artificial microstructure 2. These two types of materials are combined to produce equivalent permittivity and permeability for each of the metamaterial units. These two physical parameters correspond respectively to an electric field response and a magnetic field response of the metamaterial unit. Because the metamaterial as a whole needs to make a macroscopic electromagnetic response to an incident electromagnetic wave, a response of individual metamaterial basic units to the incident electromagnetic wave need to form a continuous response. This requires that a size of each of the metamaterial basic units be $\frac{1}{10}$ to $\frac{1}{5}$ of a wavelength of the incident electromagnetic wave, and preferably, to be $\frac{1}{10}$ of the incident electromagnetic wave. An electromagnetic response characteristic of the metamaterial is determined by a characteristic of the artificial microstructure 2, wherein an electromagnetic response of the artificial microstructure 2 largely depends on a pattern topological characteristic and geometric size of a metal wire thereof. According to the aforesaid principles, the topological pattern and geometric size of each of the artificial microstructures 2 arranged in the metamaterial space may be designed to set an electromagnetic parameter of each point in the metamaterial.

Figure 1:
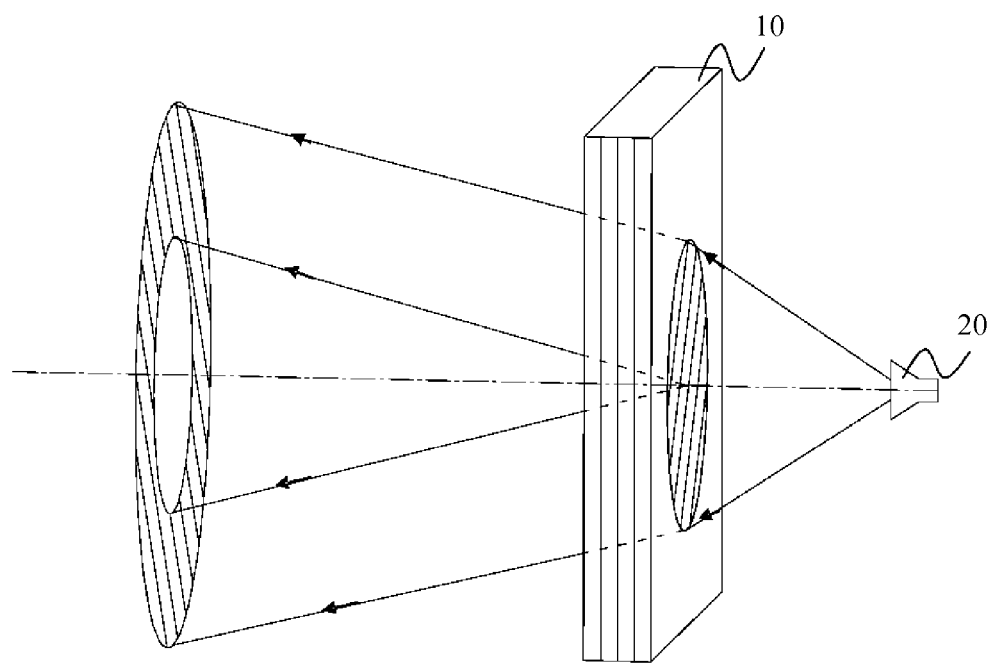
FIG. 1 is a schematic view of splitting a wave beam by an electromagnetic wave beam splitter according to an embodiment of the present invention.

FIG. 1 shows a schematic view of splitting a wave beam by an electromagnetic wave beam splitter according to a first embodiment of the present invention. After an electromagnetic wave emitted by a signal source 20 is incident on the beam splitter according to the present invention, an emergent electromagnetic wave forms an annular radiation region. This can satisfy the requirements of, for example, avoiding an obstacle and interference. The beam splitter comprises a functional layer 10 made of at least one metamaterial sheet 3. As commonly known, a refractive index of an electromagnetic wave $n=\sqrt{\epsilon\times\mu}$. When an electromagnetic wave propagates from one medium into another medium, the electromagnetic wave refracts. When refractive indices are distributed non-uniformly within a substance, the electromagnetic wave deflects toward a position having a relative large refractive index. The refractive index distribution of the functional layer 10 may be adjusted by designing the electromagnetic parameter of each of the points in the metamaterial sheets 3 that make the functional layer 10, thereby achieving the objective of changing a propagation path of the electromagnetic wave. According to the aforesaid principles, the effect of electromagnetic wave radiation illustrated in FIG. 1 may be implemented by designing the refractive index distribution of the functional layer 10.

Figure 2:
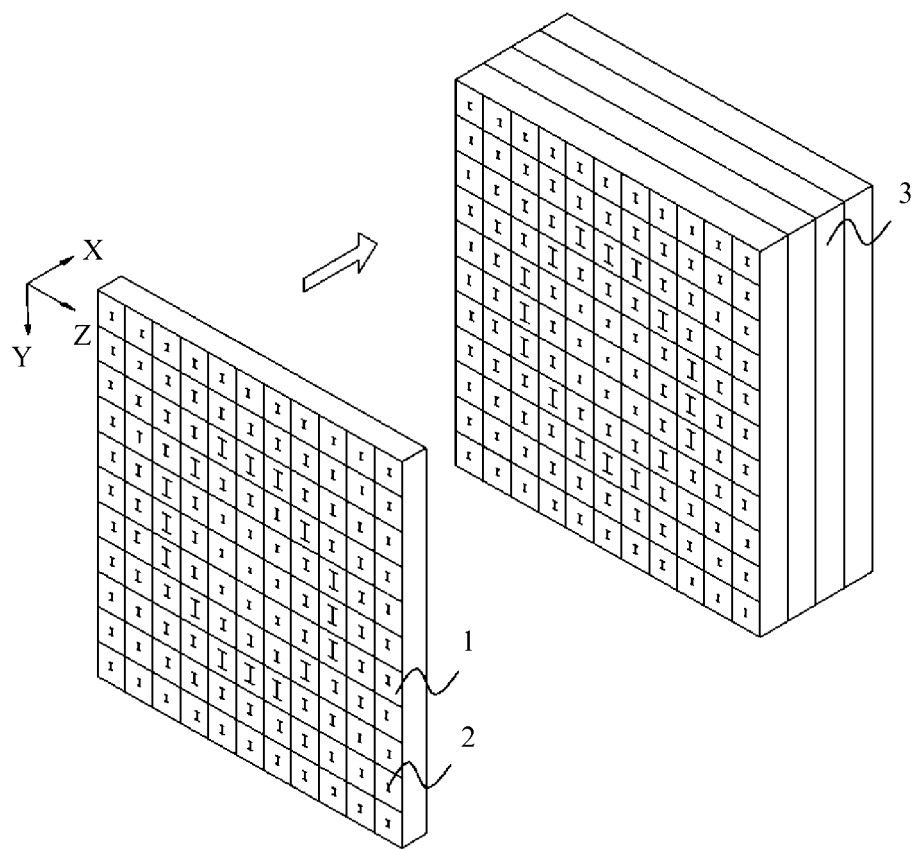
FIG. 2 is a schematic structural view of a functional layer used in an embodiment of the present invention.

Each of the metamaterial sheets 3 that make the functional layer 10 illustrated in FIG. 1 comprises a sheet-like substrate 1 and a plurality of artificial microstructures 2 attached on the substrate 1, wherein each of the artificial microstructures 2 and the portion of the substrate 1 occupied by the artificial microstructure make a metamaterial unit. A specific structure of the functional layer 10 is illustrated in FIG. 2. In this embodiment, the functional layer 10 is made by stacking a plurality of metamaterial sheets 3 together, wherein the metamaterial sheets 3 are arranged and assembled with an equal distance therebetween, or every two sheets are combined by directly bonding a front surface of one of them to a rear surface of the other. In a specific implementation, the number of metamaterial sheet 3 may be designed according to requirements. Each of the metamaterial sheets 3 is formed by an array of a plurality of metamaterial units. The functional layer 10 as a whole may be regarded as being formed by arranging a plurality of metamaterial units as an array in X, Y, and Z directions. In the functional layer 10, a side length of each of the metamaterial units is $\frac{1}{10}$ to $\frac{1}{5}$ of a wavelength of the incident electromagnetic wave. In this embodiment, each of the metamaterial sheets 3 has the same refractive index distribution. For the convenience of description, a refractive index distribution rule of one metamaterial sheet 3 is described in details. The refractive index distribution rule of the other metamaterial sheets 3 are the same. In this embodiment, the refractive index distribution of each of the metamaterial sheets 3 satisfies the following first rule: the metamaterial sheet 3 comprises a circular region and an annular region concentric to the circular region on a YZ plane, wherein a refractive index increases continuously as a radius increases and refractive indices at the same radius are the same within the circular region, and a refractive index decreases continuously as a radius increases and refractive indices at the same radius are the same within the annular region.

Figure 3:
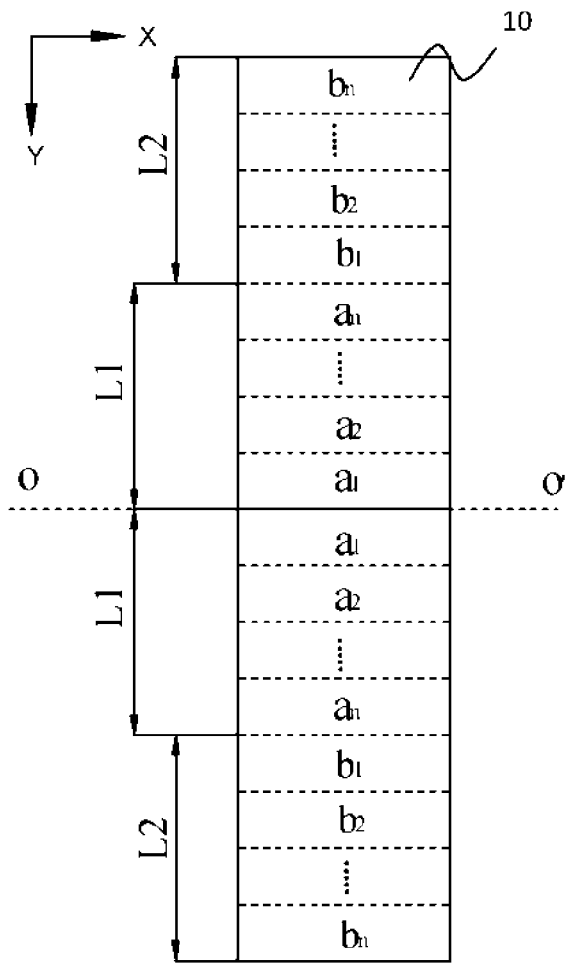
FIG. 3 is a schematic view illustrating a change in refractive indices of the functional layer illustrated in FIG. 2 along with a radius.

As shown in FIG. 2, the functional layer 10 is formed by stacking a plurality of metamaterial sheets 3 having the same refractive index distribution rule. Therefore, a refractive index distribution of the functional layer 10 according to the present invention satisfies the first rule. FIG. 3 is a schematic view illustrating a change in refractive indices of the functional layer 10 illustrated in FIG. 2 along with the radius. As shown in the figure, the functional layer 10 comprises two regions, wherein a radius length of a first region is L1, and a refractive index of each of the metamaterial units in a direction wherein the radius increases respectively is $a_1$, $a_2$, $a_3$, ..., $a_n$; a width of a second region is L2, and a refractive index of each of the metamaterial units in a direction wherein the radius increases respectively is $b_1, b_2, b_3, \ldots b_n$, and the refractive indices satisfy the following relationship:

$$a_1 \leq a_2 \leq a_3 \leq \ldots \leq a_n \quad (1)$$

$$b_1 \geq b_2 \geq b_3 \geq \ldots \geq b_n \quad (2)$$

where n is a natural number not smaller than 2, and equations (1) and (2) do not take the equal sign at the same time. The functional layer 10 allows an electromagnetic wave that is emitted by the signal source 20 and radiates in a spherical wave form to form the annular radiation region illustrated in FIG. 1, and a width of the annular region formed by the electromagnetic wave remains unchanged as the electromagnetic wave propagates; hence, it is required that a deflection angle between an incident electromagnetic wave and an emergent electromagnetic wave becomes bigger and bigger in a direction toward the circle center within the first region, and a deflection angle between an incident electromagnetic wave and an emergent electromagnetic wave becomes bigger and bigger in a direction away from the circle center within the second region. As commonly known, a bigger difference of refractive indices between neighboring metamaterial units produces a bigger deflection angle of an electromagnetic wave. Therefore, in order to keep the width of the ring unchanged in the electromagnetic wave propagation process, electromagnetic waves that are incident on a position close to the circle center and on a position close to the edge of the functional layer 10 need to be enabled to deflect at a large angle. Hence, the change in the refractive indices of the metamaterial units within the regions satisfies the following relationships:

$$(a_1-a_2) \geq (a_2-a_3) \geq \ldots \geq (a_{n-1}-a_n) \quad (3)$$

$$(b_1-b_2) \leq (b_2-b_3) \leq \ldots \leq (b_{n-1}-b_n) \quad (4)$$

Regarding the functional layer 10 satisfying the aforesaid relationship equations, the first region thereof has refractive indices that change as follows on a YZ plane: the change in the refractive index decreases gradually as the radius increases by using the metamaterial unit having the refractive index $a_1$ as the circle center; hence, using the metamaterial unit having $a_1$ as the circle center, a deflection angle at which the electromagnetic wave that is incident on the first region decreases gradually as the radius increases, and the incident electromagnetic wave closer to the circle center deflects at a bigger deflection angle. Similarly, the second region has refractive indices that change as follows on the YZ plane: within the second region, the change in the refractive index increases gradually as the radius increases; hence, a deflection angle at which the electromagnetic wave that is incident on the second region increases gradually as the radius increases, and the incident electromagnetic wave closer to the edge of the metamaterial sheet 3 deflects at a bigger deflection angle. The beam splitting effect illustrated in FIG. 1 may be implemented by specific design and calculation to enable these deflection angles to satisfy specific rules respectively. Similar to a convex lens, as long as a light deflection angle at each surface point and a refractive index of a material are known, a corresponding surface curvature characteristic may be designed to enable an incident light to be emitted at an expected angle. Similarly, regarding the beam splitter according to the present invention, the artificial microstructure 2 of each of the metamaterial units is designed to obtain permittivity $\epsilon$ and a permeability $\mu$ of the unit, and then the refractive index distribution of the functional layer 10 is designed so that the change $\Delta n$ in refractive indices of neighboring metamaterial units can implement a specific deflection angle for the electromagnetic wave. That is, the electromagnetic wave that is emitted by the signal source 20 and radiates in a spherical wave form may form the annular radiation region illustrated in FIG. 1, and a width of the annular region formed thereby remains unchanged as the electromagnetic wave propagates. The ring width may be adjusted by further design, so as to satisfy specific requirements for avoiding obstacles.

Figure 4:
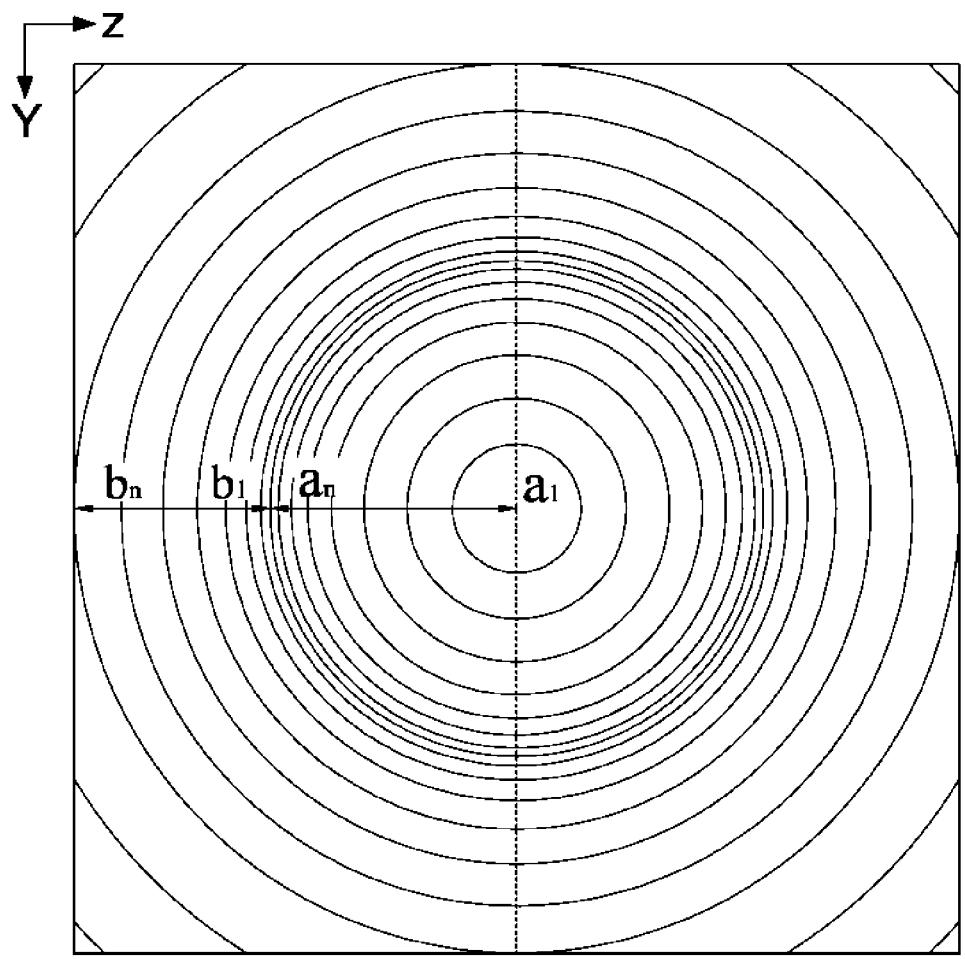
FIG. 4 is a schematic view illustrating a refractive index distribution of the functional layer illustrated in FIG. 2 on a YZ plane.

In order to illustrate the refractive index distribution rule of the metamaterial sheet 3 on the YZ plane in a more intuitive manner, metamaterial units having the same refractive index are connected to make a line, and a size of the refractive index is represented by density of the lines. Higher density represents higher refractive indices. Hence, the refractive index distribution of the metamaterial sheet 3 satisfying all the relationship equations described above is illustrated in FIG. 4.

It is proved by experiments that, regarding an artificial microstructure 2 having the same pattern, a geometric size thereof is in proportion to permittivity E. Therefore, given that an incident electromagnetic wave is known, by properly designing the topological pattern of the artificial microstructure 2 and the arrangement of artificial microstructures 2 of different sizes on the metamaterial sheet, the refractive index distribution of the functional layer 10 may be adjusted, thereby achieving the objective of the present invention.

The artificial microstructure 2 implementing the refractive index and the refractive index change distribution relationship described above may be implemented in multiple modes. Regarding an artificial microstructure 2 having a two-dimensional structure, the geometric shape thereof may be axially symmetric or not axially symmetric; and a three-dimensional structure may be any three-dimensional pattern that is non-90 degree rotationally symmetric.

As shown in FIG. 2, all the two-dimensional artificial microstructures 2 are attached on the surface of the sheet-like substrate 1. The artificial microstructure 2 illustrated in the figure is in an "I" shape, and comprises a vertical first metal wire 201 and second metal wires 202 respectively connected on two ends of the first metal wire 201 and perpendicular to the first metal wire 201. The functional layer 10 is made of a plurality of identical metamaterial sheets 3. Each of the metamaterial sheets 3 comprises a circular region and an annular region concentric to the circular region on the YZ plane, wherein the size of the "I-shaped" artificial microstructures 2 increases continuously as the radius increases and the sizes of the artificial microstructures 2 at the same radius are the same within the circular region; and the size of the "I-shaped" artificial microstructures 2 decreases continuously as the radius increases and the sizes of the artificial microstructures 2 at the same radius are the same within the annular region.

It should be noted that because the metamaterial unit is actually a cube rather than a point, the round form and annular form are only used to approximately describe the respective forms. Actually, the metamaterial units having the same or substantially the same refractive index are distributed on a jagged circumference. The specific design thereof is similar to the programming process (for example, OpenGL) for plotting points when a computer depicts a smooth curve such as a circular curve or an elliptical curve by using cubic pixel points. When the pixel points are very small relative to the curve, the curve appears to be smooth; and when the pixel points are large relative to the curve, the curve appears to be jagged.

Figure 5:
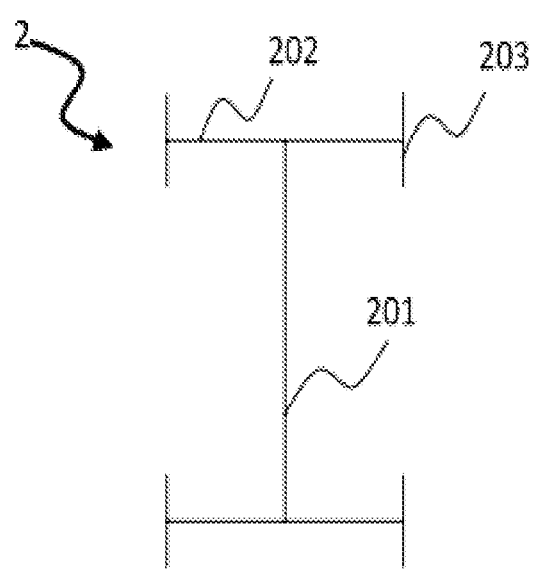
FIG. 5 is a schematic structural view of a second embodiment derived from the artificial microstructure illustrated in FIG. 2.

FIG. 5 illustrates an embodiment derived from the artificial microstructure 2 illustrated in FIG. 2. The derived artificial microstructure 2 in FIG. 5 not only comprises a first metal wire 201 and a second metal wire 202 that make the "I" shape, but also comprises a third metal wire 203 connected respectively on two ends of the second metal wire 202 and perpendicular to the second metal wire 202.

Figure 6:
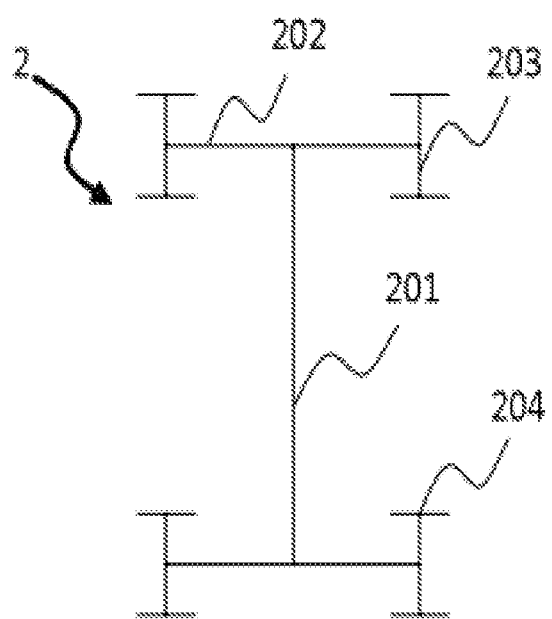
FIG. 6 is a schematic structural view of a third embodiment derived from the artificial microstructure illustrated in FIG. 5.

FIG. 6 illustrates an embodiment further derived from the artificial microstructure 2 illustrated in FIG. 5, wherein the artificial microstructure 2, on the basis of FIG. 5, further comprises a fourth metal wire 204 connected respectively on two ends of the third metal wire 203 and perpendicular to the third metal wire 203. Similarly, there are an infinite number of artificial microstructures 2 according to the present invention. A length of the second metal wire 202 is smaller than the first metal wire 201; a length of the third metal wire 203 is smaller than the second metal wire 202; and a length of the fourth metal wire 204 is smaller than the third metal wire 203, and so on.

Each of the first metal wires 201 is connected only to the second metal wire 202, and does not intersect with any other metal wires. Any $N^{th}$ metal wire intersects only with an $(N-1)^{th}$ metal wire and an $(N+1)^{th}$ metal wire, and does not intersect with any other metal wires, where N is greater than or equal to 2 herein.

It should be understood that the embodiments of the present invention may use artificial microstructures 2 having a symmetric structure in a back-to-back double "E" shape or in a cross shape, or use artificial microstructures 2 having other asymmetric structures, as long as the refractive index distribution of each of the metamaterial sheets 3 on the YZ plane satisfies all the relationship equations described above. By setting the shape, size, and arrangement of the artificial microstructures 2, the electromagnetic wave that is emitted from the signal source 20 and radiates in a spherical wave form may be enabled to form the annular radiation region illustrated in FIG. 1, wherein the width of the annular region formed thereby remains unchanged as the electromagnetic wave propagates.

In a specific implementation, the permittivity and permeability thereof may be obtained by calculation and emulation, and then the shape and size of the artificial microstructure 2 are adjusted until the values of the permittivity and permeability thereof satisfy the refractive index distribution described above.

The artificial microstructure 2 according to the embodiment is made of at least one metal wire such as a copper wire or a silver wire, and has a specific pattern. The metal wire is attached on the substrate 1 by etching, electroplating, drilling, photolithography, electron etching, or ion etching. Etching is a preferred manufacturing process, which comprises the steps of: after designing a proper two-dimensional pattern of the artificial microstructures 2, entirely attaching a piece of metal foil on the substrate 1 firstly; afterwards, removing a portion of the foil outside the preset pattern of the artificial microstructures 2 by using etching equipment and a chemical reaction between a solvent and a metal; and subsequently obtaining the artificial microstructures 2 arranged in a array from the remaining portion. The substrate 1 may be made of ceramic, such a macromolecular material as polytetrafluoroethylene, an epoxy resin, an FR4, and an F4B, a ferroelectric material, a ferrite material, or a ferromagnetic material.

Figure 7:
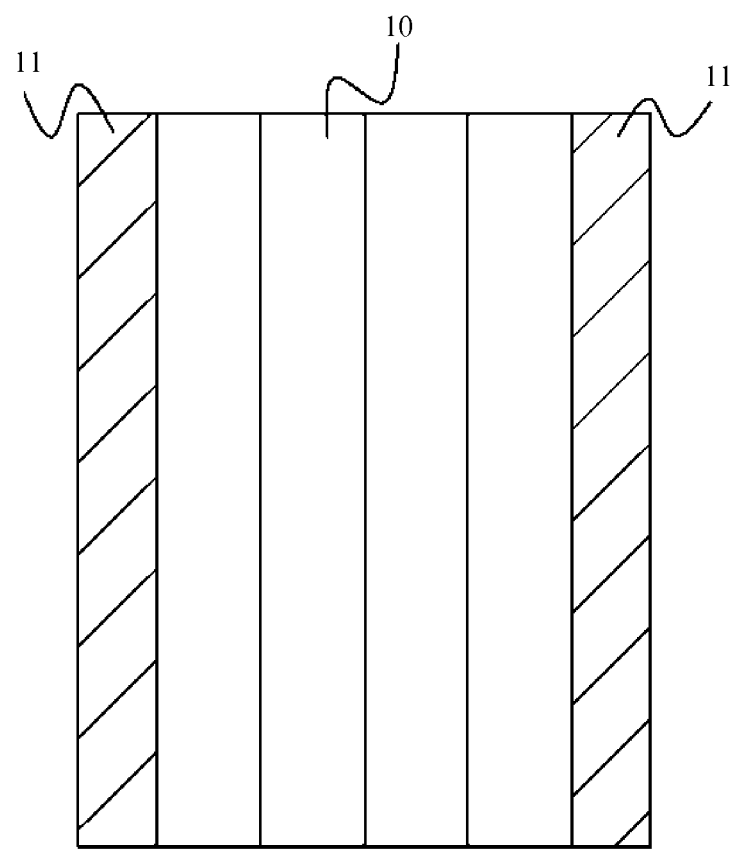
FIG. 7 is a schematic structural view of an electromagnetic wave beam splitter according to another embodiment of the present invention.

FIG. 7 is a schematic view of an electromagnetic wave beam splitter according to another embodiment of the present invention. In this embodiment, impedance matching layers (not shown) are provided respectively on an electromagnetic wave incident surface and an electromagnetic wave emergent surface of a functional layer 10 making the beam splitter, wherein impedance on one side of the impedance matching layer is same as air impedance, and impedance on the other side is the same as impedance of the functional layer 10, and impedance therebetween changes continuously to form a layer of gradually changing impedance, eliminating a sudden impedance change between the air and the functional layer 10, thereby further reducing reflection of the electromagnetic wave. The impedance matching layer may be made by using a common material or a metamaterial. The objective of impedance matching may be achieved as long as a layer of gradually changing impedance is formed between the air and the functional layer 10.

The present invention uses the metamaterial panel 10 that has the "ring-shaped" refractive index distribution on the YZ plane, and has the circular region and the annular region concentric to the circular region, wherein the refractive index increases continuously as the radius increases within the circular region; the refractive index decreases continuously as the radius increases within the annular region, so that the incident electromagnetic wave within the circular region deflects toward the edge of the metamaterial sheet 3, the incident electromagnetic wave within the annular region deflects toward the circle center. This enables the incident electromagnetic wave on the beam splitter to form the annular radiation region after being emitted. The refractive index distribution of the metamaterial sheets 3 may be obtained by further calculation and emulation, and the shape, size, and arrangement of the artificial microstructures 2 are adjusted to further adjust the size and width of the annular shape.

Detailed above are specific embodiments of the present invention. It should be noted that, persons of ordinary skill in the art may make various improvements and modifications without departing from the principle of the present invention, and these improvements and modifications shall fall within the protection scope of the present invention.

What is claimed is:

1. An electromagnetic wave beam splitter, comprising a functional layer made of at least one metamaterial sheet, and impedance matching layers arranged respectively on an electromagnetic wave incident surface and an electromagnetic wave emergent surface of the functional layer, wherein the metamaterial sheet comprises a sheet-like substrate and a plurality of artificial microstructures attached on the substrate, the artificial microstructure being in an axially symmetric structure; each of the metamaterial sheets has the same refractive index distribution; the metamaterial sheet comprises a circular region and an annular region concentric to the circular region; a refractive index increases continuously as a radius increases and refractive indices at the same radius are the same within the circular region; a refractive index decreases continuously as a radius increases and refractive indices at the same radius are the same within the annular region; the artificial microstructures have the same geometric shape; sizes of the artificial microstructures increase continuously as the radius increases and sizes of the artificial microstructures at the same radius are the same within the circular region; and sizes of the artificial microstructures decrease continuously as the radius increases and the sizes of the artificial microstructures are the same at the same radius within the annular region.

2. The electromagnetic wave beam splitter according to claim 1, wherein the functional layer is formed by a plurality of metamaterial sheets stacked together.

3. The electromagnetic wave beam splitter according to claim 1, wherein each of the artificial microstructures comprises a two-dimensional structure or three-dimensional structure consisting of at least one metal wire.

4. An electromagnetic wave beam splitter, comprising a functional layer made of at least one metamaterial sheet, wherein the metamaterial sheet comprises a sheet-like substrate and a plurality of artificial microstructures attached on the substrate; each of the metamaterial sheets has the same refractive index distribution; the metamaterial sheet comprises a circular region and an annular region concentric to the circular region; a refractive index increases continuously as a radius increases and refractive indices at the same radius are the same within the circular region; and a refractive index decreases continuously as a radius increases and refractive indices are the same at the same radius within the annular region.

5. The electromagnetic wave beam splitter according to claim 4, wherein the functional layer is formed by a plurality of metamaterial sheets stacked together.

6. The electromagnetic wave beam splitter according to claim 4, wherein the artificial microstructures have the same geometric shape; sizes of the artificial microstructures increase continuously as the radius increases and sizes of the artificial microstructures at the same radius are the same within the circular region; and the sizes of the artificial microstructures decrease continuously as the radius increases and sizes of the artificial microstructures at the same radius are the same within the annular region.

7. The electromagnetic wave beam splitter according to claim 6, wherein the artificial microstructure is an axially symmetric structure.

8. The electromagnetic wave beam splitter according to claim 7, wherein the artificial microstructure is in an "I" shape, cross shape, or back-to-back double "E" shape.

9. The electromagnetic wave beam splitter according to claim 6, wherein each of the artificial microstructures comprises a two-dimensional structure or three-dimensional structure consisting of at least one metal wire.

10. The electromagnetic wave beam splitter according to claim 9, wherein the metal wire is a copper wire or a silver wire.

11. The electromagnetic wave beam splitter according to claim 10, wherein the metal wire is attached on the substrate by etching, electroplating, drilling, photolithography, electron etching, or ion etching.

12. The electromagnetic wave beam splitter according to claim 4, wherein the substrate is made of ceramic, a macromolecular material, a ferroelectric material, a ferrite material, or a ferromagnetic material.

13. The electromagnetic wave beam splitter according to claim 4, wherein the beam splitter further comprises impedance matching layers arranged respectively on an electromagnetic wave incident surface and an electromagnetic wave emergent surface of the functional layer.

* * * * *